United States Patent
Akaba et al.

(10) Patent No.: US 10,850,639 B2
(45) Date of Patent: Dec. 1, 2020

(54) VEHICLE SEAT CONTROL DEVICE, VEHICLE SEAT CONTROL METHOD AND VEHICLE SEAT CONTROL PROGRAM

(71) Applicant: HONDA MOTOR CO., LTD., Tokyo (JP)

(72) Inventors: Hiroshi Akaba, Wako (JP); Yasuhiro Minakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/927,128

(22) Filed: Mar. 21, 2018

(65) Prior Publication Data

US 2018/0281625 A1 Oct. 4, 2018

(30) Foreign Application Priority Data

Mar. 28, 2017 (JP) ................... 2017-063811

(51) Int. Cl.
| | | |
|---|---|---|
| *B60N 2/427* | (2006.01) | |
| *B60N 2/02* | (2006.01) | |
| *B60R 21/015* | (2006.01) | |
| *B60N 2/14* | (2006.01) | |
| *B60R 21/013* | (2006.01) | |

(Continued)

(52) U.S. Cl.
CPC ............. *B60N 2/0276* (2013.01); *B60N 2/14* (2013.01); *B60N 2/4279* (2013.01); *B60N 2/42736* (2013.01); *B60R 21/013* (2013.01); *B60R 21/0134* (2013.01); *B60R 21/01554* (2014.10); *B60R 21/207* (2013.01); *B60R 22/26* (2013.01);

(Continued)

(58) Field of Classification Search
CPC ........ B60R 21/01554; B60R 21/01558; B60R 2021/0102; B60N 2/42736; B60N 2/42754; B60N 2/0276; B60N 2/01566; B60N 2002/022; B60N 2/4279
See application file for complete search history.

(56) References Cited

U.S. PATENT DOCUMENTS 5,328,234 A * 7/1994 Daniel ................. B60N 2/4235
296/68.1
6,168,234 B1 * 1/2001 Haynes ................. B60N 2/143
297/344.21

(Continued)

FOREIGN PATENT DOCUMENTS

| CN | 1738736 | 2/2006 |
|---|---|---|
| CN | 103619649 | 3/2014 |

(Continued)

OTHER PUBLICATIONS

Chinese Office Action for Chinese Patent Application No. 201810229663.9 dated Mar. 30, 2020.

*Primary Examiner* — Timothy J Brindley
(74) *Attorney, Agent, or Firm* — Amin, Turocy & Watson, LLP

(57) ABSTRACT

A vehicle seat control device includes a collision prediction part that predicts a collision direction of a collision occurring in a vehicle, a first driving part that rotates a vehicle seat around an axis of the vehicle in a substantially upward/downward direction, and a controller that controls the first driving part such that a direction of the vehicle seat is changed to an opposite direction with respect to the collision direction on the basis of the predicted collision direction.

8 Claims, 8 Drawing Sheets

(51) Int. Cl.
*B60R 22/26* (2006.01)
*B60R 21/207* (2006.01)
*B60R 21/0134* (2006.01)
*B60R 21/01* (2006.01)

(52) U.S. Cl.
CPC ............... *B60N 2002/0268* (2013.01); *B60R 2021/01013* (2013.01); *B60R 2021/01252* (2013.01)

(56) References Cited

U.S. PATENT DOCUMENTS

| | | | |
|---|---|---|---|
| 7,934,763 B2* | 5/2011 | Mabuchi | B60N 2/01 |
| | | | 296/65.07 |
| 8,528,975 B2* | 9/2013 | Maier | B60N 2/14 |
| | | | 297/344.21 |
| 2003/0023363 A1* | 1/2003 | Katz | B60N 2/0244 |
| | | | 701/49 |
| 2003/0230919 A1* | 12/2003 | Park | B60N 2/42754 |
| | | | 297/344.1 |
| 2016/0221475 A1* | 8/2016 | Sugiyama | B60N 2/72 |
| 2017/0036565 A1* | 2/2017 | Ohno | B60N 2/06 |
| 2018/0201213 A1* | 7/2018 | Gandhi | B60N 2/0276 |
| 2018/0222347 A1* | 8/2018 | Hirayama | B60N 2/0276 |
| 2019/0126783 A1* | 5/2019 | Baccouche | B60N 2/0292 |
| 2019/0217754 A1* | 7/2019 | Fukawatase | B60N 2/3011 |
| 2019/0299897 A1* | 10/2019 | Gramenos | B60N 2/4279 |

FOREIGN PATENT DOCUMENTS

| | | | |
|---|---|---|---|
| CN | 105857134 | 8/2016 | |
| DE | 10120167 C1 * | 8/2002 | ............ B60N 2/16 |
| JP | 2010064632 A * | 3/2010 | |
| JP | 2015-160521 | 9/2015 | |
| JP | 2017-030636 | 2/2017 | |

* cited by examiner

100

VEHICLE SEAT CONTROL DEVICE, VEHICLE SEAT CONTROL METHOD AND VEHICLE SEAT CONTROL PROGRAM

CROSS-REFERENCE TO RELATED APPLICATION

Priority is claimed on Japanese Patent Application No. 2017-063811, filed Mar. 28, 2017, the content of which is incorporated herein by reference.

BACKGROUND OF THE INVENTION

Field of the Invention

The present invention relates to a vehicle seat control device, a vehicle seat control method and a vehicle seat control program.

Description of Related Art

In order to protect an occupant who sits on a vehicle seat, a seat belt, an airbag, or the like, is known. Japanese Unexamined Patent Application, First Publication No. 2017-30636 discloses a technology of, when a collision occurs during rotation of a rotatable rear seat, returning the rear seat from a rotation position to an original state and reliably performing protection of an occupant on a rear seat with an airbag.

SUMMARY OF THE INVENTION

In the technology of the related art, while rotating the seat in order to increase an effect of an airbag has been performed, however, increasing a protection effect of occupant using the seat has not been attempted.

An aspect of the present invention is to provide a vehicle seat control device, a vehicle seat control method and a vehicle seat control program that are capable of protecting an occupant effectively using a vehicle seat when a collision occurs.

(1) A vehicle seat control device according to an aspect of the present invention includes a collision prediction part that predicts a collision direction of a collision occurring in a vehicle; a first driving part that rotates a vehicle seat around an axis of the vehicle in a substantially upward/downward direction; and a controller that controls the first driving part such that a direction of the vehicle seat is changed to an opposite direction with respect to the collision direction on the basis of the predicted collision direction.

(2) In the aspect of (1), the collision prediction part may further predict an aspect of the collision occurring in the vehicle, and the controller may control the first driving part according to a direction or a rotating speed of the vehicle seat determined from a plurality of directions or a plurality of rotating speeds of the vehicle seat on the basis of an aspect of the predicted collision.

(3) In the aspect of (1) or (2), the collision prediction part may further predict a time until the collision occurring in the vehicle, and the controller may control the first driving part according to a rotating speed determined from a plurality of rotating speeds of the vehicle seat on the basis of a length of the predicted time.

(4) In the aspect of any one of (1) to (3), when the collision direction predicted by the collision prediction part is updated before the collision occurs, the controller may control the first driving part on the basis of the updated prediction of the collision direction, and may adjust the direction of the vehicle seat.

(5) In the aspect of any one of (1) to (4), the vehicle seat control device may further include a body protecting section that deforms at least one of a sitting surface of the vehicle seat and a side support included in a backrest section and that protects an occupant's body, and the controller may operate the body protecting section when rotation of the vehicle seat is not terminated until the collision predicted by the collision prediction part occurs.

(6) In the aspect of any one of (1) to (5), the vehicle seat control device may further include a second driving part that causes the side support of the backrest section of the vehicle seat to protrude toward an occupant, and the controller may control the second driving part such that the side support is caused to protrude after the vehicle seat has been rotated.

(7) In the aspect of any one of (1) to (6), the vehicle seat control device may further include a third driving part that moves a sitting surface of the vehicle seat in a rising direction, and the controller may change the direction of the vehicle seat by controlling the first driving part while raising the sitting surface by controlling the third driving part when a collision is predicted by the collision prediction part.

(8) In the aspect of any one of (1) to (7), the vehicle seat control device may further include a third driving part that moves a sitting surface of the vehicle seat in a rising direction, and the controller may control the third driving part such that the sitting surface is raised after the collision has occurred.

(9) In the aspect of any one of (1) to (8), the vehicle seat control device may further include a speed reducing part that, after the vehicle seat has been rotated in the opposite direction with respect to the collision direction by the controller, moves the vehicle seat in the collision direction at a speed lower than the collision speed.

(10) A vehicle seat control method according to an aspect of the present invention causes a computer to predict a collision direction of a collision occurring in a vehicle, to rotate a vehicle seat around an axis of the vehicle in a substantially upward/downward direction, and to change a direction of the vehicle seat to an opposite direction with respect to the collision direction on the basis of the predicted collision direction.

(11) A vehicle seat control program according to an aspect of the present invention causes a computer to predict a collision direction of a collision occurring in a vehicle, to rotate a vehicle seat around an axis of the vehicle in a substantially upward/downward direction, and to change a direction of the vehicle seat to an opposite direction with respect to the collision direction on the basis of the predicted collision direction.

According to the aspects of (1), (10) and (11), as the vehicle seat is rotated in the opposite direction with respect to the direction in which the collision will occur, an occupant can be received in the backrest section, and occupant protection safety upon collision can be improved.

According to the aspect of (2), as an aspect of a collision is predicted, appropriate control of the vehicle seat according to differences in aspects can be performed, and occupant protection safety can be improved.

According to the aspect of (3), as the time until the collision will occur is predicted, the rotating speed of the vehicle seat can be adjusted on the basis of a length of time until the collision will occur, and occupant protection safety can be improved due to rotation of the vehicle seat.

According to the aspect of (4), even when the collision direction predicted before the collision occurs is updated, as the direction of the vehicle seat is adjusted on the basis of the updated information, safety of the occupant protection can be reliably improved.

According to the aspect of (5), as an occupant protection function is added such as protruding the side supports of the vehicle seat and raising the sitting surface of the vehicle seat, further improvement of safety related to occupant protection can be achieved.

According to the aspect of (6), as the side supports are protruded after the vehicle seat is rotated, holding properties of the seat with respect to the occupant can be enhanced.

According to the aspect of (7), since the vehicle seat is rotated after the sitting surface has been raised, interference of the occupant's leg portion with an object on a rotation trajectory upon rotation of the vehicle seat can be suppressed, and further improvement of safety related to occupant protection can be achieved.

According to the aspect of (8), a cushioning property of the sitting surface with respect to further collisions occurring due to rebound after the collision has occurred can be improved, and occupant protection safety can be improved.

According to the aspect of (9), as the speed reducing part moving in the collision direction is provided, an impact received by an occupant upon occurrence of the collision can be attenuated, and occupant protection safety can be improved.

DETAILED DESCRIPTION OF THE INVENTION

Embodiments of a vehicle seat control device, a vehicle seat control method and a program of the present invention will be described with reference to the accompanying drawings.

First Embodiment

Figure 1:
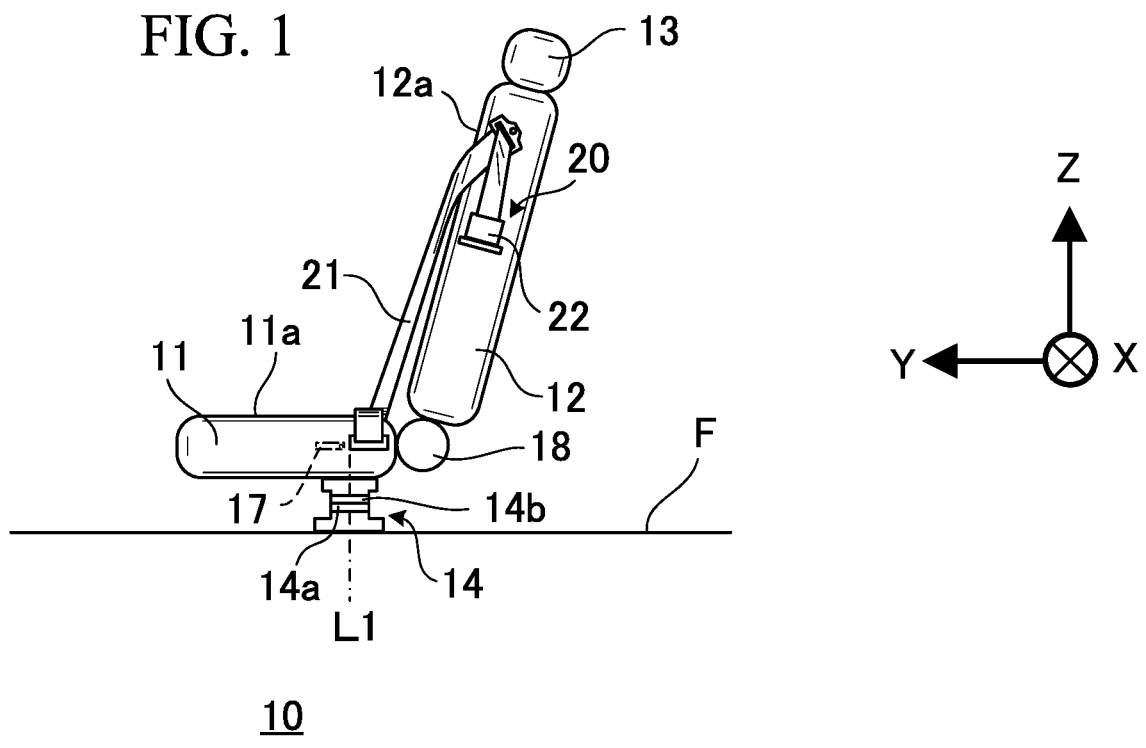
FIG. 1 is a side view showing a configuration of a vehicle seat of a vehicle seat control device of a first embodiment.

FIG. 1 is a side view showing a configuration of a vehicle seat 10 of a vehicle seat control device 1 of a first embodiment. The vehicle seat 10 on which an occupant sits is rotatably installed on a floor surface F. A seat belt apparatus 20 configured to protect an occupant upon collision or the like is installed on a side surface of one side of the vehicle seat 10. A vehicle on which the vehicle seat control device 1 is installed (hereinafter, referred to as a vehicle M) is, for example, a two-wheeled, three-wheeled or four-wheeled vehicle, or the like, and a drive source thereof is an internal combustion engine such as a diesel engine, a gasoline engine, or the like, an electric motor, or a combination thereof. The electric motor is operated using power generated by a generator connected to the internal combustion engine, or power discharged from a secondary battery or a fuel cell.

The vehicle seat 10 includes, for example, a sitting section 11 and a backrest section 12. In the vehicle seat 10, one end of the sitting section 11 and a lower end of the backrest section 12 are rotatably connected to each other by a first connecting section 18. A headrest 13 is installed on an upper end of the backrest section 12.

The sitting section 11 is a member configured to support a lower body of an occupant. A sitting surface 11a on which an occupant D sits is formed on the sitting section 11. The sitting surface 11a is formed of a cushioning material.

The sitting section 11 is attached to the floor surface F via a rotation connecting section 14. The sitting section 11 is disposed to be rotatable around a rotation axis L1 serving as a vertical axis that is an axis in a substantially upward/downward direction of the vehicle in the present invention with respect to the floor surface F by the rotation connecting section 14. The rotation axis L1 may have a direction of an upward/downward direction with respect to the floor surface F or may not necessarily be perpendicular to the floor surface F.

The rotation connecting section 14 includes a seat direction detecting part 14a and a first driving part 14b. The seat direction detecting part 14a detects a rotation direction of the sitting section 11 with respect to the floor surface F. A controller 80, which will be described below, is connected to the seat direction detecting part 14a. The seat direction detecting part 14a outputs the detection results to the controller 80. The first driving part 14b drives the vehicle seat 10 such that it rotates around the rotation axis L1. The first driving part 14b is connected to the controller 80, which will be described below, and controlled by the controller 80. The first driving part 14b is rotated by the controller 80, and the vehicle seat 10 is rotated to an arbitrary rotation angle.

The backrest section 12 is a member configured to support an occupant's upper body. A backrest surface 12a is formed on the backrest section 12. The backrest surface 12a is formed of a cushioning material.

The headrest 13 is installed on a tip of the backrest section 12. The headrest 13 supports the head or the neck of the occupant who sits on the sitting section 11. The backrest section 12 can be reclined to a rotation angle with respect to the floor surface F by the first connecting section 18. The first connecting section 18 has, for example, a rotation hinge structure.

The first connecting section 18 includes, for example, a biasing means (not shown) such as a rotation spring or the like, and biases the backrest section 12 in a direction in which an angle formed between the backrest section 12 and the sitting section 11 is narrowed (a +Y direction).

When a lever 17 is released, the backrest section 12 falls forward about the first connecting section 18 (in the +Y direction) due to a biasing force of the first connecting section 18. When the occupant applies a force rearward to the backrest surface 12a (in a −Y direction) in a released state of the lever 17, the backrest section 12 falls rearward about the first connecting section 18.

Figure 2:
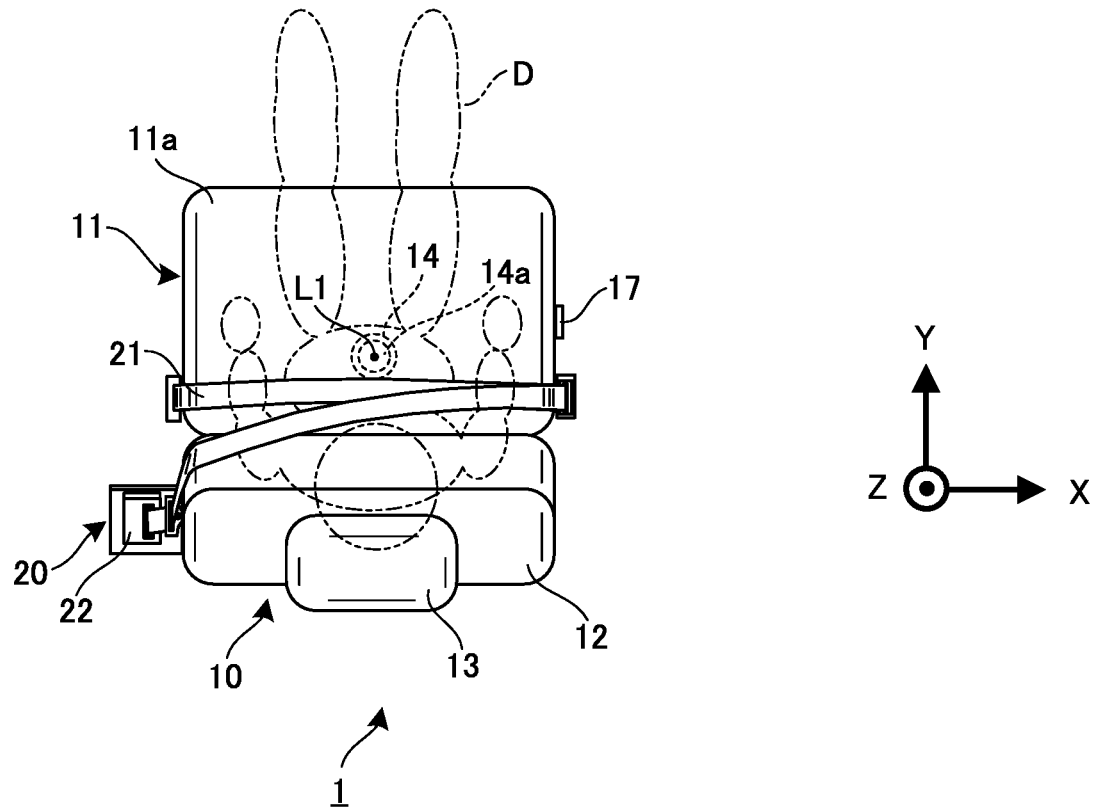
FIG. 2 is a plan view showing a configuration of the vehicle seat control device of the first embodiment.

FIG. 2 is a plan view showing a configuration of the vehicle seat control device 1 of the first embodiment. The seat belt apparatus 20 is attached to one of both side surfaces of the backrest section 12. While a position of the seat belt apparatus 20 is determined according to whether the vehicle seat 10 is installed on either the left or right side of the vehicle M in an advancing direction, the position is not limited thereto and may be appropriately varied. The seat belt apparatus 20 may be built into the backrest section 12.

The seat belt apparatus 20 is, for example, a three-point seat belt, and includes a belt (a seat belt) 21, a winding apparatus 22 and the first driving part 14b. The belt 21 in an accommodated state is accommodated in the winding apparatus 22 in a wound state. An accommodating space (not shown) in which the belt 21 in the wound state is accommodated is formed in the winding apparatus 22. The winding apparatus 22 includes a biasing means (not shown) such as a rotation spring or the like configured to wind the belt 21. The belt 21 is biased by the biasing means in the winding direction. When the occupant D fastens the belt 21, the belt 21 is maintained in a tension state and slack in the belt 21 is reduced by the biasing means of the winding apparatus 22.

The occupant D pulls the belt 21 out of the winding apparatus 22, and constrains him or herself to the vehicle seat 10. Here, the belt 21 binds the abdomen of the occupant D to the vehicle seat 10 in a horizontal direction tightly, and binds the upper half of the occupant D to the vehicle seat 10 in a diagonal direction tightly. The winding apparatus 22 mechanically locks extraction of the belt 21 and restrains the occupant D in the vehicle seat 10 when a predetermined acceleration or more is applied.

Figure 3:
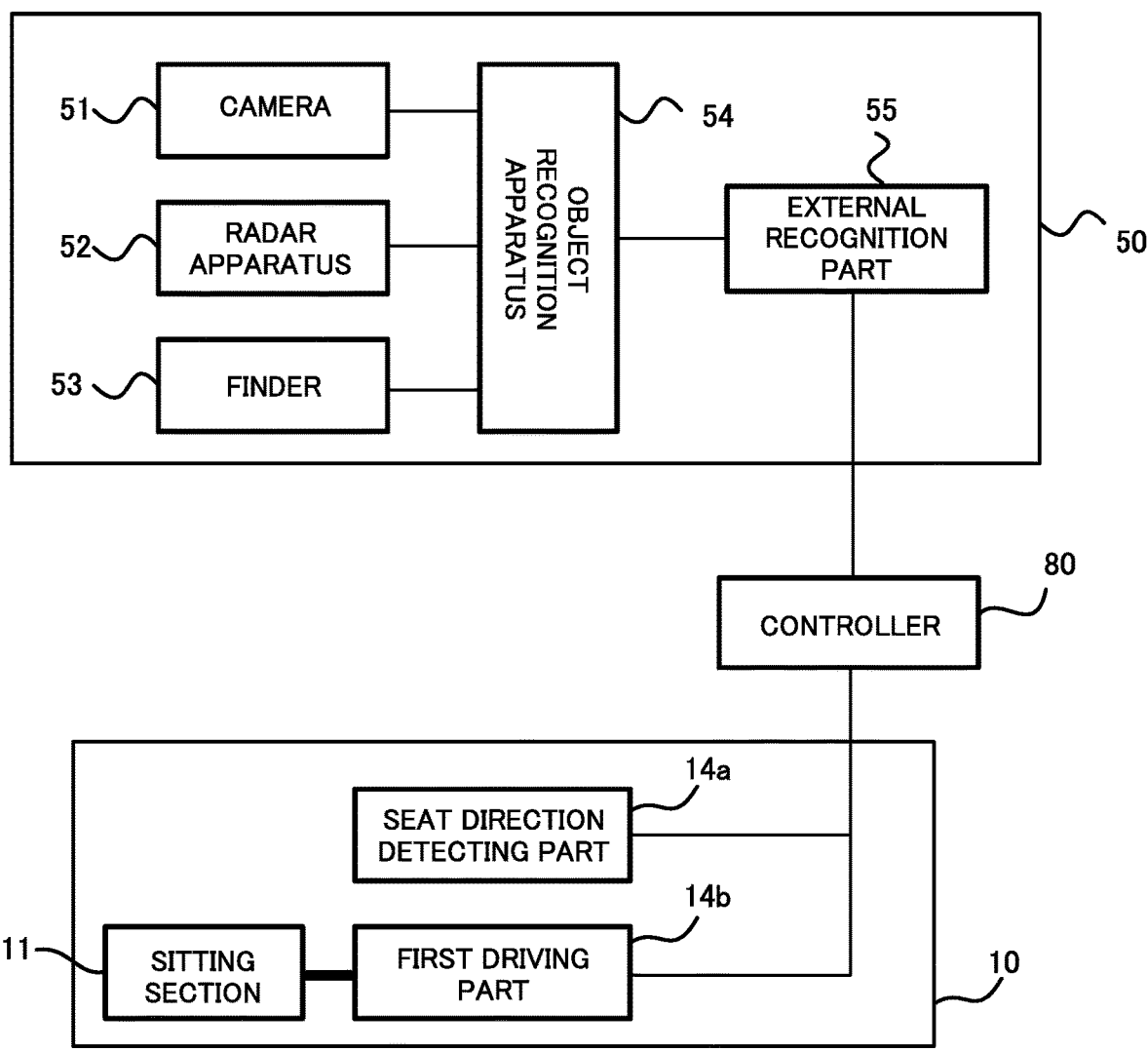
FIG. 3 is a block diagram showing a configuration of the vehicle seat control device.

FIG. 3 is a block diagram showing a configuration of the vehicle seat control device 1. The vehicle seat control device 1 includes the vehicle seat 10, a collision prediction part 50 and the controller 80. The collision prediction part 50 includes, for example, a camera 51, a radar apparatus 52, a finder 53, an object recognition apparatus 54 and an external recognition part 55. The collision prediction part 50 predicts a collision state generated in the vehicle M on the basis of a surrounding state of the vehicle M.

The first driving part 14b is controlled on the basis of the prediction results of the collision prediction part 50 and the detection results of the seat direction detecting part 14a. The controller 80 adjusts a rotation direction of the vehicle seat 10 on the basis of the rotation direction of the sitting section 11 detected by the seat direction detecting part 14a.

The external recognition part 55 and the controller 80 are realized by executions of a program (software) with a processor such as a central processing unit (CPU) or the like. In addition, some or all of functional units of the controller 80, which will be described below, may be realized by hardware such as a large scale integration (LSI), an application specific integrated circuit (ASIC), a field-programmable gate array (FPGA), or the like, or may be realized by cooperation between software and hardware.

The camera 51 is a digital camera using a solid-state image sensing device such as a charge coupled device (CCD), a complementary metal oxide semiconductor (CMOS), or the like. One or a plurality of cameras 51 are attached to arbitrary places on the vehicle M. When a side in front is imaged, the camera 51 is attached to an upper section of a front windshield, a back surface of a rearview mirror, or the like. When a side to the rear is imaged, the camera 51 is attached to an upper section of a rear windshield, a back door, or the like. When a lateral side is imaged, the camera 51 is attached to a door mirror or the like. The camera 51, for example, periodically repeats imaging of the surroundings of the vehicle M. The camera 51 may be a stereo camera.

The radar apparatus 52 radiates radio waves such as millimeter waves to the surroundings of the vehicle M and detects the radio waves reflected by an object (reflected waves) to detect at least a position (a distance and an azimuth) of the object. One or a plurality of radar apparatuses 52 are attached to arbitrary places on the vehicle M. The radar apparatus 52 may detect a position and a speed of an object using a frequency modulated continuous wave (FMCW) method.

The finder 53 is light detection and ranging or laser imaging detection and ranging (LIDAR) finder for measuring scattered light with respect to radiated light and detecting a distance to an object. One or a plurality of finders 53 are attached to arbitrary places on the vehicle M.

The object recognition apparatus 54 performs sensor fusion processing with respect to the detection results using some or all of the camera 51, the radar apparatus 52 and the finder 53, and recognizes a position, a type, a speed, and so on, of an object. The object recognition apparatus 54 outputs the recognized results to the external recognition part 55.

The external recognition part 55 recognizes a state such as a position, a speed, an acceleration, and so on, of a neighboring vehicle on the basis of the information input from the camera 51, the radar apparatus 52 and the finder 53 via the object recognition apparatus 54. The position of a neighboring vehicle may be represented by a representative point such as a centroid, corners, or the like, of the neighboring vehicle, or may be represented by a region indicated by an outline of the neighboring vehicle. "The state" of a neighboring vehicle may include an acceleration or a jerk of a neighboring vehicle, or "an action state" (for example, whether or not lane changing is being performed, or about to be performed).

In addition, the external recognition part 55 may recognize positions of a guard rail, an electricity pole, a parked vehicle, a person such as a pedestrian or the like, and other objects, in addition to a neighboring vehicle. Accordingly, the external recognition part 55 recognizes a state around the vehicle M, and predicts a state in which an acceleration will be applied due to a collision or the like with the vehicle M. Here, the external recognition part 55 predicts, for example, a collision direction of the vehicle M on the basis of time differences in the recognized information.

The external recognition part 55 also predicts an aspect of collision generated in the vehicle M, in addition to the collision direction of the vehicle M. The aspect of the collision is, for example, aspects including classification of a type of a collision target such as a vehicle against a vehicle or the like, a type of collision state of a vehicle such as a rotation of a vehicle or a collision speed or the like of a vehicle, and classification of a collision interval for a vehicle such as a time until the collision will occur, or the like.

The external recognition part 55 outputs the prediction results to the controller 80 when it is predicted that an acceleration of a predetermined level or more will be applied in a collision direction due to collision or the like with the vehicle M. The external recognition part 55 predicts, for example, that the acceleration of a predetermined level or more will be applied in the collision direction by determining whether the acceleration exceeds a preset threshold.

The controller 80 controls the first driving part 14b on the basis of the prediction results of the external recognition part 55. When it is predicted that the acceleration of a predetermined level or more will be applied to the vehicle M in the collision direction of the vehicle M due to collision or the like, on the basis of the output result of the seat direction detecting part 14a, the controller 80 changes a rotation direction of the vehicle seat 10 by controlling the first driving part 14b on the basis of the collision direction of the vehicle M.

Figure 4:
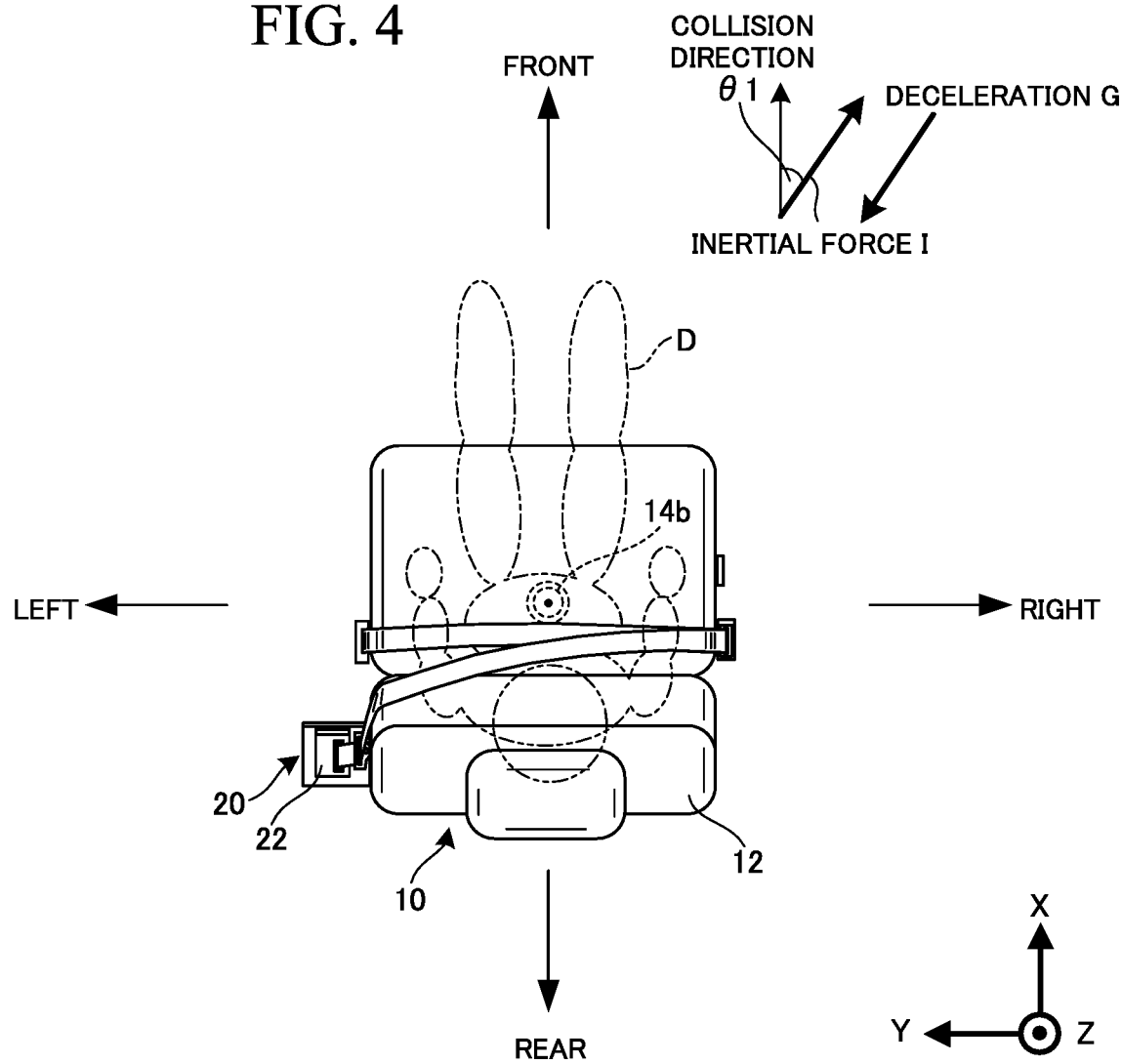
FIG. 4 is a view showing an acceleration generated in the vehicle seat during collision.

FIG. 4 is a view showing an acceleration generated in the vehicle seat 10 upon collision. For example, in a state in which the vehicle seat 10 is directed forward, when the vehicle M collides with an object in a diagonally forward collision direction θ1, an acceleration G in a direction opposite to a deceleration is applied to the vehicle M. Here, an inertial force I in the collision direction θ1 which is opposite to the direction of the acceleration G is generated in the occupant D's body. When the vehicle seat 10 is directed forward, the occupant D's body in which the inertial force I is generated is restrained in the vehicle seat 10 by the belt 21.

Figure 5:
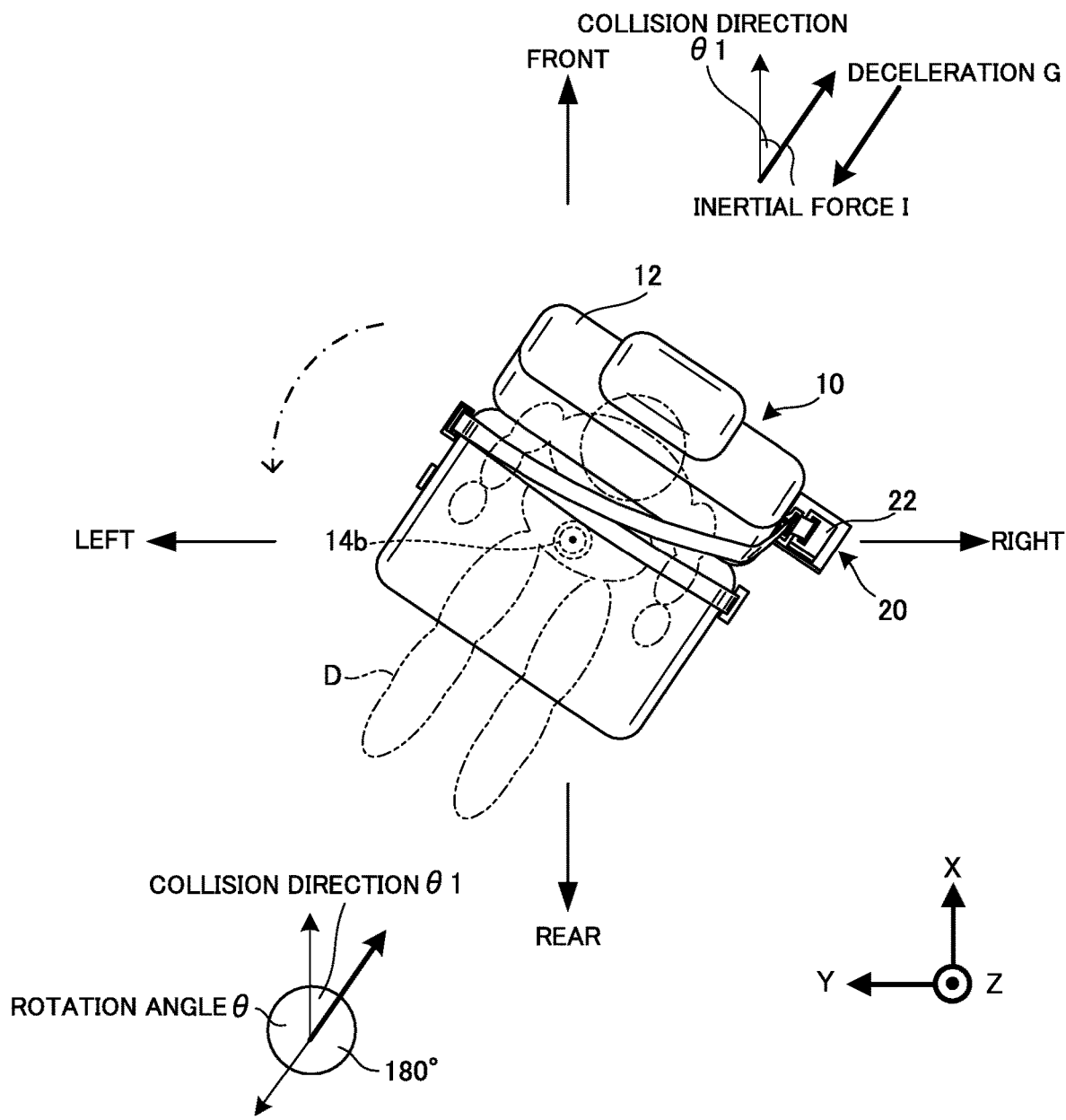
FIG. 5 is a view showing an acceleration generated upon collision in a rotating state of the vehicle seat.

FIG. 5 is a view showing an acceleration generated upon collision in a state in which the vehicle seat 10 is rotated. The body of the occupant D in which the inertial force I is generated is received by the backrest section 12 when the vehicle seat 10 is directed, for example, in a direction opposite to the collision direction θ1 of the vehicle M and the vehicle M collides with an object in the collision direction θ1. Here, since the entire backrest section 12 receives the inertial force I generated in the occupant D, a load to the occupant D's body is reduced in comparison with the case in which the vehicle seat 10 is directed forward. In the vehicle seat control device 1, the vehicle seat 10 is rotated on the basis of the direction in which collision occurs.

The external recognition part 55 predicts the collision direction θ1 with respect to the vehicle M before the vehicle M collides with an object. The controller 80 rotates the vehicle seat 10 such that the occupant D is directed in an opposite direction with respect to the collision direction θ1. The controller 80 rotates the vehicle seat 10 in a direction of a rotation angle θ obtained by reducing the collision direction θ1 recognized by the external recognition part 55 from 180° as shown in Equation (1).

$$\theta = 180° - \theta 1 \quad (1)$$

The seat direction detecting part 14a detects a seat angle of the vehicle seat 10 with respect to a forward side of the vehicle M. The controller 80 controls the first driving part 14b on the basis of the output of the seat direction detecting part 14a, and the vehicle seat 10 is rotated to the rotation angle θ from a state in which the vehicle seat is directed in a forward direction in the vehicle M. In addition, the controller 80 may approximate the rotation angle θ to a plurality of predetermined directions of the vehicle seat 10. The plurality of directions may be directions that are determined by dividing 360° from the forward side of the vehicle M by a predetermined angle, for example, every 10°.

In addition, the controller 80 controls the first driving part 14b using the direction or the rotating speed of the vehicle seat 10 determined from the plurality of directions or the plurality of rotating speeds of the vehicle seat 10 on the basis of the aspect of the collision of the vehicle predicted by the external recognition part 55. The aspect of the collision is, for example, a concept including a difference in intensity of collision, a difference in time until collision occurs, a difference in direction of collision, and so on. For example, the controller 80 rotates the vehicle seat 10 on the basis of the intensity of the collision predicted by the external recognition part 55.

The controller 80 controls the first driving part 14b and rotates the vehicle seat 10 at a predetermined first speed, for example, when it is predicted that the acceleration generated in the vehicle M due to collision will be a predetermined threshold, which has been previously determined, or more. The controller 80 may not rotate the vehicle seat 10 when the acceleration generated in the vehicle M is less than the predetermined threshold that has been previously determined. The rotating speed may be determined from the plurality of rotating speeds, which have been previously determined.

The controller 80 may control the first driving part 14b using the rotating speed determined from the plurality of rotating speeds on the basis of the time until the collision predicted by the external recognition part 55 will occur. The controller 80 may control the first driving part 14b such that a speed at which the vehicle seat 10 is rotated is slower than a first speed, for example, when the time until the collision will occur is larger than a predetermined time that has been previously set. The controller 80 may control the first driving part 14b such that the vehicle seat 10 is rotated according to a rotating speed that is lower than the first speed determined from the plurality of rotating speeds such that rotation of the vehicle seat 10 is terminated, for example, during the time until the collision occurs.

The collision direction previously predicted by the external recognition part 55 may be different from a collision direction that occurs in actuality. The external recognition part 55 updates prediction of the collision direction before the collision actually occurs. When the collision direction predicted by the external recognition part 55 is updated before the collision occurs, the controller 80 may adjust the direction of the vehicle seat 10 by controlling the first driving part 14b on the basis of the updated prediction of the collision direction.

Figure 6:
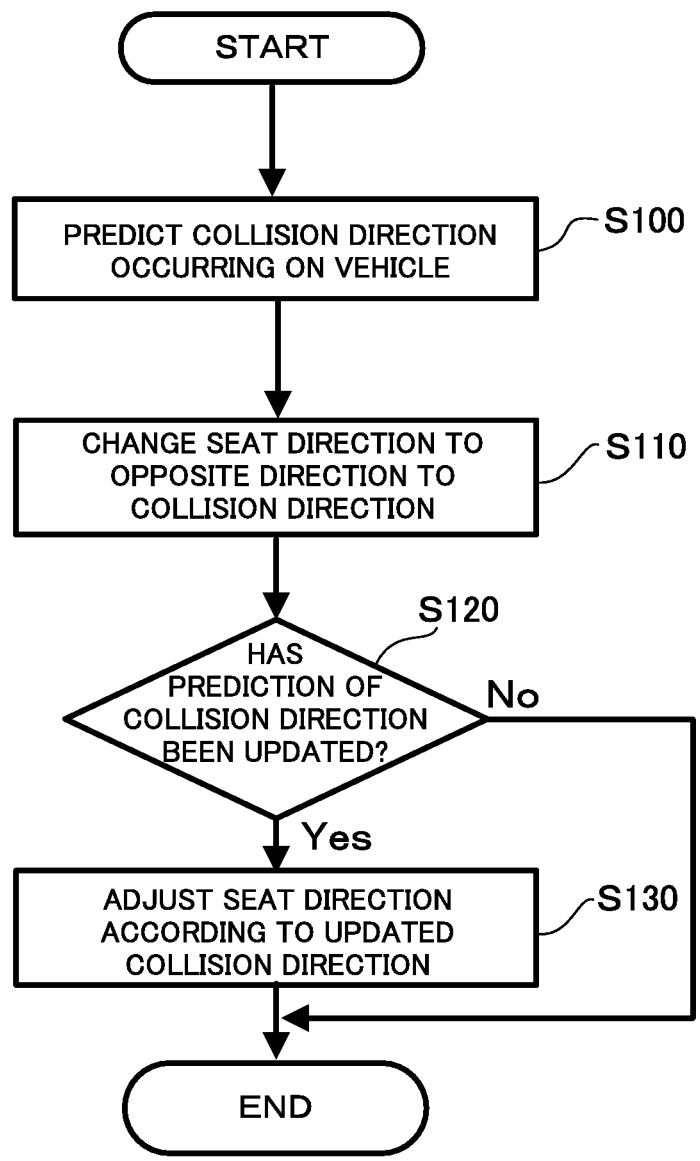
FIG. 6 is a flowchart showing a flow of processing of the vehicle seat control device.

Next, a flow of processing of the vehicle seat control device 1 will be described. FIG. 6 is a flowchart showing the flow of the processing of the vehicle seat control device 1.

The external recognition part 55 acquires information on the surroundings of the vehicle M on the basis of the information input from the camera 51, the radar apparatus 52 and the finder 53 via the object recognition apparatus 54. The external recognition part 55 predicts a collision direction of a collision generated in the vehicle M on the basis of the information on the surroundings of the vehicle M (step S100). The controller 80 controls the first driving part 14b such that the direction of the vehicle seat 10 is changed to a direction opposite to the collision direction on the basis of the collision direction with respect to the vehicle M predicted by the external recognition part 55 (step S110).

When prediction of the collision direction is updated by the external recognition part 55 before the collision occurs in actuality (step S120), the first driving part 14b is controlled on the basis of the updated prediction of the collision direction, and the direction of the vehicle seat 10 is adjusted (step S130).

According to the vehicle seat control device 1 of the above-mentioned first embodiment, as the vehicle seat 10 is rotated in a direction opposite to the collision direction, the occupant D's body can be received by the backrest section 12 to increase occupant protection safety. Further, according to the vehicle seat control device 1, since at least one of the seat direction and the rotating speed of the vehicle seat 10 is changed due to the collision aspect of the collision occurring in the vehicle M, occupant protection safety can be increased. In addition, according to the vehicle seat control device 1, when prediction of the collision direction is updated before the collision occurs in actuality, since the seat direction of the vehicle seat 10 is adjusted on the basis of the updated collision direction, occupant protection safety can be further increased.

Second Embodiment

The vehicle seat control device 1 of the first embodiment updates the seat direction of the vehicle seat 10 and protects the occupant on the basis of the prediction of the collision direction of the vehicle M by the collision prediction part 50. In a second embodiment, in addition to change of the seat direction, at least one of the sitting surface 11a and the backrest section of the vehicle seat 10 is deformed to protect the occupant's body. In the following description, the same names and reference numerals as in the first embodiment are appropriately used, and repeated description thereof will be omitted.

Figure 7:
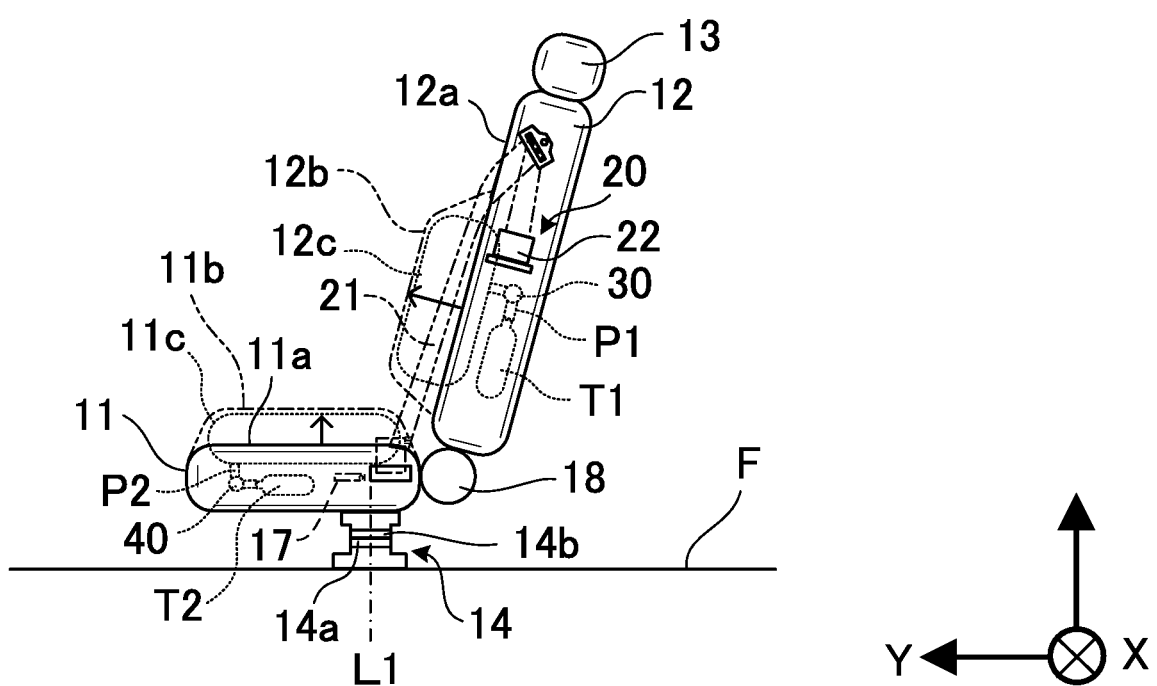
FIG. 7 is a view showing an example of a configuration of a vehicle seat of a vehicle seat control device of a second embodiment.

FIG. 7 is a view showing an example of a configuration of a vehicle seat 100 of a vehicle seat control device 2 of the second embodiment. The vehicle seat 100 further includes a body protecting section configured to protect an occupant's body by deforming at least one of the sitting surface 11a and the backrest section 12, in addition to the components of the vehicle seat 10. The backrest section 12 includes side supports 12b, a pair of bags 12c and a first tank T1.

The side supports 12b are installed on both sides of the backrest section 12, are driven by a second driving part 30, which will be described below, and protrude toward both sides of the occupant D's body.

The side supports 12b include the pair of bags 12c formed of, for example, an elastic body. The pair of bags 12c are built into both sides of the backrest section 12. The pair of bags 12c and the first tank T1 are connected by a pipeline P1. A high pressure gas is sealed in the first tank T1. The second driving part 30 is installed in the middle of the pipeline P1. The second driving part 30 is, for example, an electromagnetic valve.

The second driving part 30 is controlled by the controller 80, opens the electromagnetic valve to introduce a gas into the pair of bags 12c, and expands the pair of bags 12c to cause the side support 12b to protrude forward (in the +Y direction). The protruded side supports 12b restrain the occupant D's body from both sides, and holding properties of the seat with respect to the occupant D can be enhanced.

The sitting surface 11a includes a sitting surface rising section 11b, a bag 11c formed of an elastic body, and a second tank T2. The bag 11c and the second tank T2 are connected by a pipeline P2. A high pressure gas is sealed in the second tank T2. A third driving part 40 is installed in the middle of the pipeline P2. The third driving part 40 is, for example, an electromagnetic valve. The third driving part 40 is controlled by the controller 80, opens the electromagnetic valve to allow a gas to flow into the bag 11c to expand the bag 11c, and raises the sitting surface rising section 11b upward (in a +Z direction).

As the sitting surface 11a is raised by the sitting surface rising section 11b, interference of the occupant D's leg section with an object on a rotation trajectory while the vehicle seat 100 is rotated is prevented. In addition, as the sitting surface 11a is raised by the expanded bag 11c, a cushioning property of the sitting surface 11a is improved.

Figure 8:
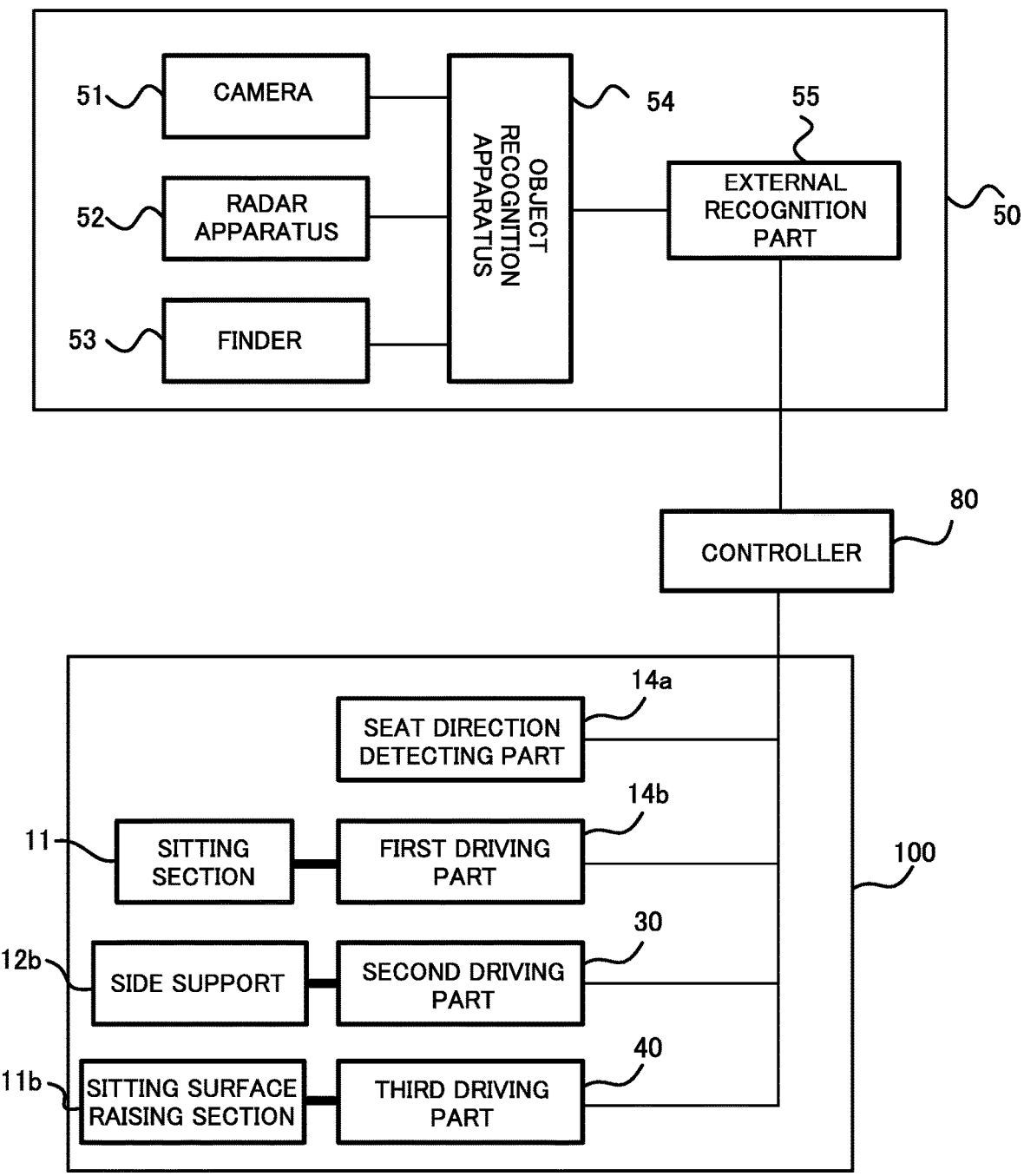
FIG. 8 is a block diagram showing a configuration of the vehicle seat control device of the second embodiment.

FIG. 8 is a block diagram showing a configuration of the vehicle seat control device 2 of the second embodiment. The vehicle seat control device 2 further includes the second driving part 30, the third driving part 40, the side support 12b and the sitting surface rising section 11b, in addition to the components of the vehicle seat control device 1 of the first embodiment.

The controller 80 controls at least one of the second driving part 30 and the third driving part 40 such that at least one of the side support 12b and the sitting surface rising section 11b are operated, for example, when rotation of the vehicle seat 100 is not terminated during a time until the collision predicted by the external recognition part 55 occurs. Accordingly, the vehicle seat control device 2 can protect the occupant D using the side support 12b or the sitting surface rising section 11b even when collision occurs in the middle of rotation of the vehicle seat 100.

In addition, the controller 80 may control the second driving part 30 to cause the side support 12b to protrude after rotating the vehicle seat 100. Accordingly, with the vehicle seat control device 2, holding properties of the seat with respect to the occupant D can be enhanced.

Further, the controller 80 may change the direction of the vehicle seat 100 by controlling the first driving part 14b while raising the sitting surface 11a by controlling the third driving part 40 when collision is predicted by the external recognition part 55. Accordingly, the vehicle seat control device 2 prevents interfere of the occupant D's leg section with an object on a rotation trajectory during rotation of the vehicle seat 100.

In addition, the controller 80 may control the third driving part 40 such that the sitting surface 11a is raised after collision occurs. Accordingly, the vehicle seat control device 2 can improve a cushioning property of the sitting surface 11a with respect to further collision occurred by rebounding after collision occurs, and improve occupant protection safety with respect to collision.

According to the vehicle seat control device 2 of the above-mentioned second embodiment, when a collision is predicted, as the vehicle seat 100 is deformed by the side support 12b or the sitting surface rising section 11b, further improvement of safety related to occupant protection can be achieved.

Third Embodiment

The vehicle seat 10 of the first embodiment protects the occupant by causing the seat direction to be directed in a direction opposite to the direction in which collision occurs, and receives the occupant D using the backrest section 12 when collision occurs. In a third embodiment, an impact of the collision can be reduced by moving the vehicle seat after the collision occurs.

Figure 9:
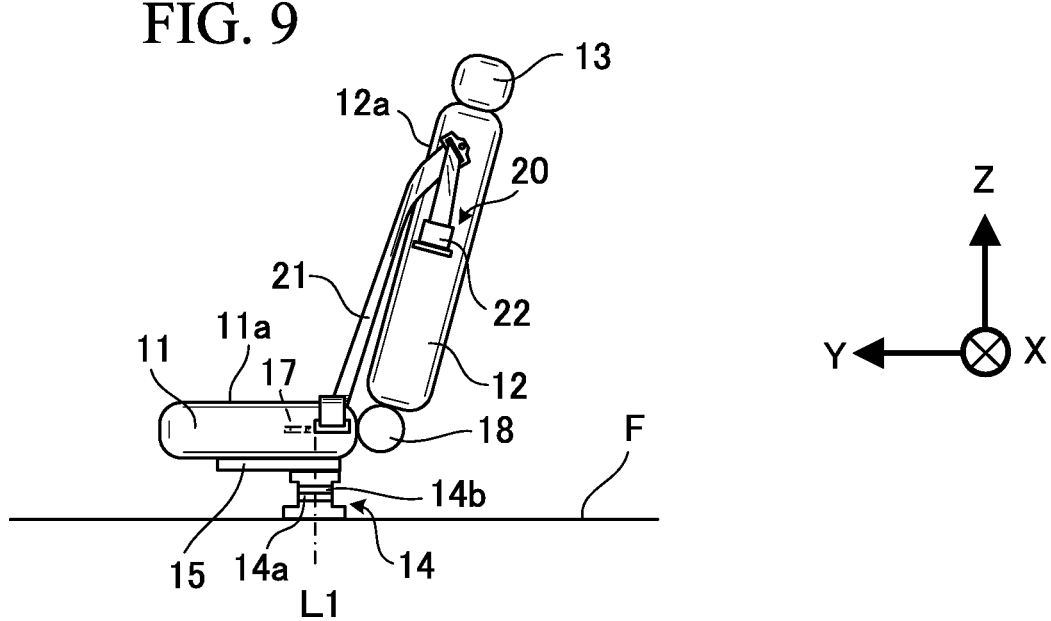
FIG. 9 is a view showing an example of a configuration of a vehicle seat of a third embodiment.

FIG. 9 is a view showing an example of a configuration of a vehicle seat 200 of a third embodiment. The vehicle seat 200 includes the speed reducing part 15 between the sitting section 11 and the rotation connecting section 14. The speed reducing part 15 connects the sitting section 11 and the rotation connecting section 14 such that the sitting section 11 is slidable in a direction of the backrest section 12. The speed reducing part 15 includes a speed reducing mechanism (not shown), and moves the sitting section 11 at a speed lower than the collision speed when the sitting section 11 is moved in the direction of the backrest section 12.

The speed reducing mechanism may employ, for example, a rotation type damper connected thereto via a gear, or an expandable damper configured to connect the sitting section 11 and the rotation connecting section 14. A speed reducing part 15 is configured to move the sitting section 11 with respect to the rotation connecting section 14 when a predetermined force or more with respect to the vehicle seat 10 is generated by the collision.

Figure 10:
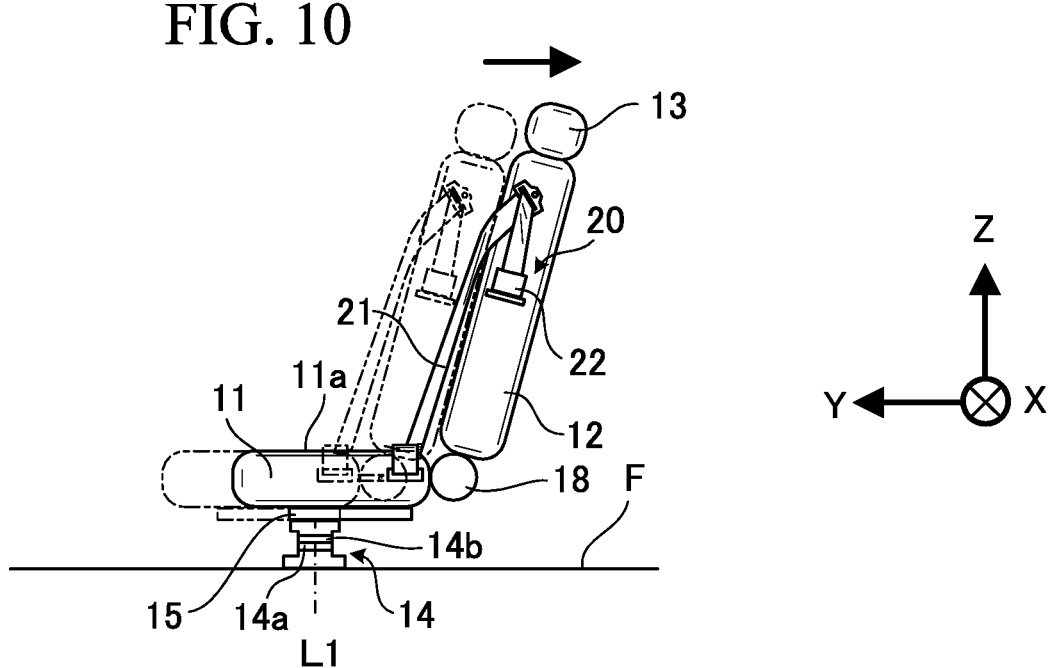
FIG. 10 is a view showing a state in which the vehicle seat is moved.

FIG. 10 is a view showing a state in which the vehicle seat 200 is moved. The vehicle seat 200 is moved in a direction, in which a collision occurs, by the speed reducing part 15 when the seat direction is directed in an opposite direction with respect to the direction in which the collision occurs. After that, the speed of the vehicle seat 200 generated due to the collision is reduced to a speed that is lower than the collision speed by a speed reducing mechanism of the speed reducing part 15. In addition, the speed reducing part 15 may be controlled such that electrical speed reduction is performed by the controller 80. In addition, when the seat direction is directed to a direction diagonal with respect to the direction in which collision occurs, the vehicle seat 200 moving in the collision direction is reduced to a speed lower than the collision speed by the speed reducing part 15.

According to the vehicle seat 200 of the above-mentioned third embodiment, as the speed reducing part 15 is provided, an impact received by the occupant D when collision occurs is attenuated, and further improvement of safety related to occupant protection can be achieved.

Hereinabove, while the aspect of performing the present invention has been described using the embodiments, the present invention is not limited to the above-mentioned embodiments and various modifications and substitutions may be made without departing from the scope of the present invention. For example, the vehicle seat may deal with an impact with respect to collision by tilting an inclination of the vehicle seat in a pitch direction or a yaw direction without rotating the sitting section.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle seat control device comprising:
a collision prediction part that predicts a collision direction of a collision occurring in a vehicle;
a first driving part that rotates a vehicle seat around an axis extending in an upward/downward direction;
a controller that controls the first driving part and changes a direction of the vehicle seat so that a back surface of a backrest section of the vehicle seat is directed toward the collision direction on the basis of the predicted collision direction; and
a body protecting section that deforms at least one of a sitting surface of the vehicle seat and a side support included in a backrest section and that protects an occupant's body,
wherein the controller operates the body protecting section in response to detecting that rotation of the vehicle seat has not terminated prior to an occurrence of the collision predicted by the collision prediction part.

2. The vehicle seat control device according to claim 1, wherein the collision prediction part further predicts an aspect of the collision occurring in the vehicle, and
the controller controls the first driving part according to a direction or a rotating speed of the vehicle seat determined from a plurality of directions or a plurality of rotating speeds of the vehicle seat on the basis of an aspect of the predicted collision.

3. The vehicle seat control device according to claim 1, wherein the collision prediction part further predicts a time until the collision occurring in the vehicle, and
the controller controls the first driving part according to a rotating speed determined from a plurality of rotating speeds of the vehicle seat on the basis of a length of the predicted time.

4. The vehicle seat control device according to claim 1, wherein, the collision prediction part updates the collision direction by generating an updated prediction, and when the collision direction is updated before the collision occurs, the controller controls the first driving part on the basis of the updated prediction of the collision direction, and adjusts a direction of the vehicle seat.

5. The vehicle seat control device according to claim 1, further comprising a second driving part that causes a side support of a backrest section of the vehicle seat to protrude toward an occupant,
wherein the controller controls the second driving part such that the side support is caused to protrude after the vehicle seat has been rotated.

6. The vehicle seat control device according to claim 1, further comprising a third driving part that moves a sitting surface of the vehicle seat in a rising direction,
wherein the controller changes the direction of the vehicle seat by controlling the first driving part while raising the sitting surface by controlling the third driving part when a collision is predicted by the collision prediction part.

7. The vehicle seat control device according to claim 1, further comprising a third driving part that moves a sitting surface of the vehicle seat in a rising direction,
wherein the controller controls the third driving part such that the sitting surface is raised after the collision has occurred.

8. The vehicle seat control device according to claim 1, further comprising a speed reducing part that, after the vehicle seat has rotated in the opposite direction with respect to the collision direction by the controller, trans-laterally moves the vehicle seat in the collision direction at a speed lower than a collision speed.

* * * * *